(No Model.) 2 Sheets—Sheet 1.

O. PIPER.
LOOM TEMPLE.

No. 422,248. Patented Feb. 25, 1890.

Witnesses:
Murray C. Boyer
A. V. Groupe

Inventor:
Orin Piper
by his Attorneys
Howson v Howson

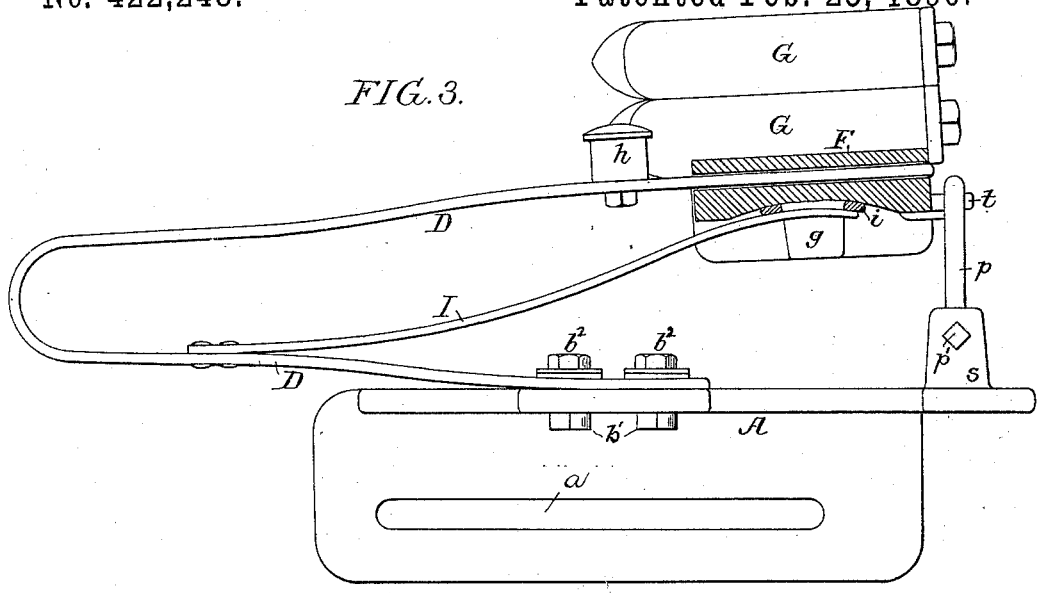
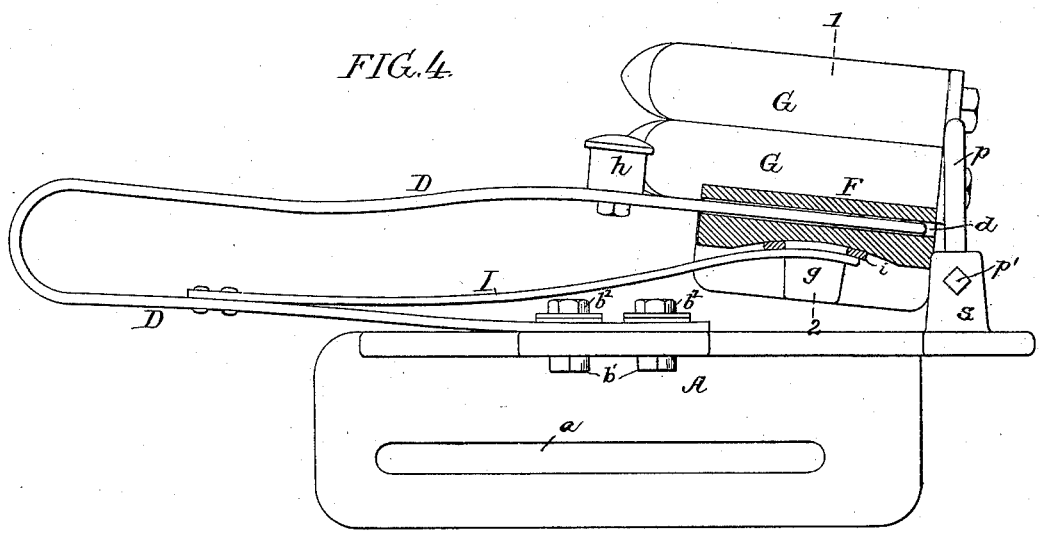
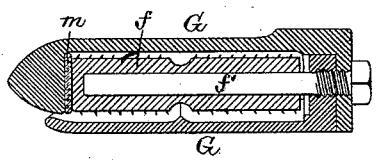

UNITED STATES PATENT OFFICE.

ORIN PIPER, OF MANCHESTER, NEW HAMPSHIRE.

LOOM-TEMPLE.

SPECIFICATION forming part of Letters Patent No. 422,248, dated February 25, 1890.

Application filed October 17, 1889. Serial No. 327,328. (No model.)

*To all whom it may concern:*

Be it known that I, ORIN PIPER, a citizen of the United States, and a resident of Manchester, Hillsborough county, New Hampshire, have invented certain Improvements in Loom-Temples, of which the following is a specification.

One object of my invention is to so construct a loom-temple as to render unnecessary the use of extra warp-threads at the selvages for preventing the warp from straining the reed in beating up, a further object being to render unnecessary the use of a lubricant upon the roller of the temple, and thereby prevent the soiling of the fabric, and a still further object being to provide a cheap, compact, and serviceable form of a draw or slide temple. These objects I attain in the manner hereinafter set forth, reference being had to the accompanying drawings, in which—

Figure 1:
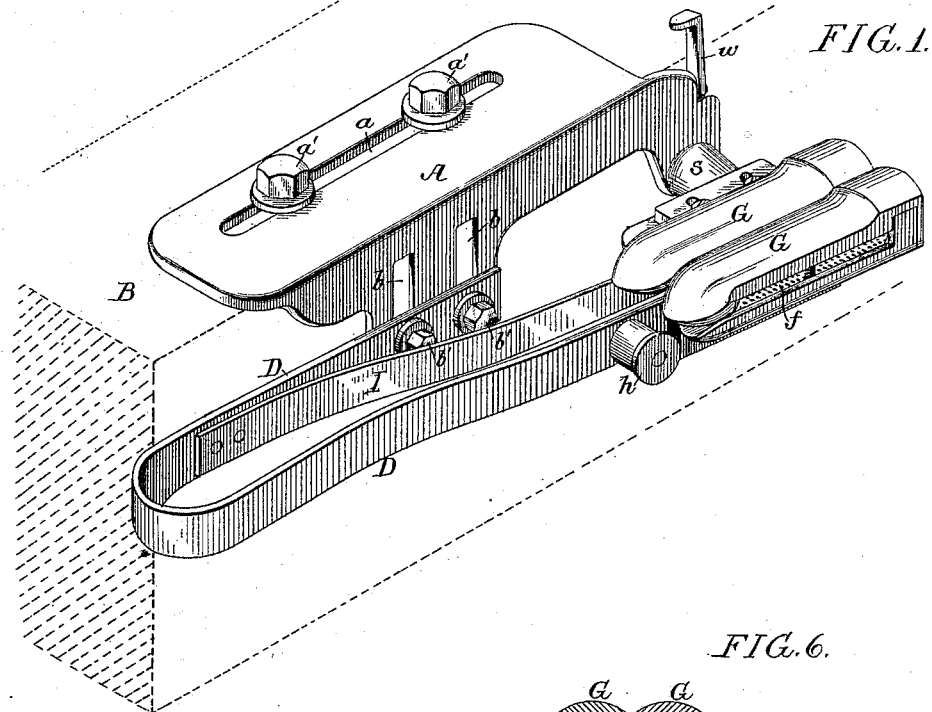
Figure 6:
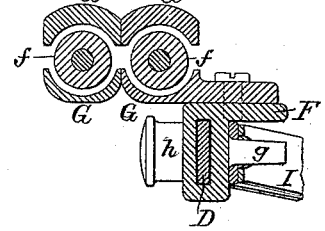
Figure 2:
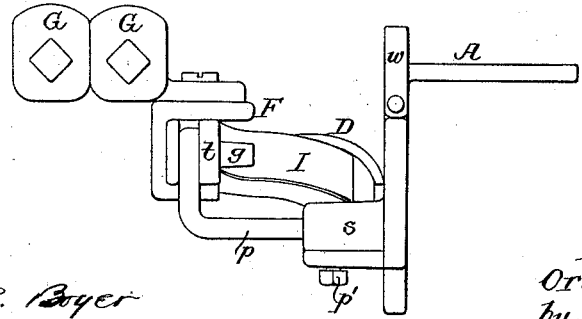

Figure 1 is a perspective view of a loom-temple constructed in accordance with my invention. Fig. 2 is an end view of the same. Figs. 3 and 4 are inverted plan views, partly in section, and showing the temple in two different positions. Fig. 5 is a longitudinal section of one of the pods of the temple and its roller; and Fig. 6 is a transverse section of the temple on the line 1 2, Fig. 4.

A represents the fixed plate of the temple, which has a longitudinal slot $a$ for the reception of the screws $a'$, whereby the temple is secured to the breast-beam B of the loom, (shown by dotted lines in Fig. 1,) the slot permitting the lateral adjustment of the temple to accord with the width of the cloth which is being woven.

In the depending front portion of the plate A are vertical slots $b\ b$, which receive bolts $b'$, the heads of which are on the inner side of this portion of the plate, as shown in Figs. 3 and 4, these bolts serving to fasten to the said plate A the inner end of a spring D, which is confined by nuts $b^2$ on the bolts and is in the form of a loop, the outer free end of the spring entering an opening $d$, formed in the temple plate or block F, the latter having two roller casings or pods G, side by side and each containing a toothed roller $f$, mounted upon a spindle $f'$, screwed into the end of the roller casing or pod, as shown in Fig. 5, and serving also to secure together the two parts of said casing or pod, as usual. The depending portion of the plate A is so far in advance of the front of the breast-beam as to provide a space for the heads of the bolts $b'$ between said beam and plate.

From the back of the temple-plate F projects a stud $g$, which passes through an opening in the outer end of a spring I, the latter being secured at its inner end to the spring D, as shown in Figs. 1, 3, and 4. When, therefore, the parts are in their normal position, as shown in Fig. 3, the pods G and their rollers occupy their innermost position in respect to the strip or web of cloth which is being woven; but when by contact of the lathe of the loom with the bumper-block $h$ on the spring D said spring is compressed the spring I is likewise compressed, and a longitudinal thrust is thus imparted to the temple-block F, so as to cause it to slide outward upon the end of the spring D, and thus stretch the web of the fabric; hence by the time the reed reaches the beating-up point the lateral or inward pull upon the selvage-warps will have been counteracted and the outer dents of the reed thus relieved from the strain which would be caused by such an inward draft or pull upon the selvage-warps.

The two extremes of movement of the temple are shown in Figs. 3 and 4.

A washer $i$, of leather or equivalent material, is preferably interposed between the free end of the spring I and the face of the temple-block to prevent wear which would be due to contact of these two metallic portions.

The double rollers serve to supplement the sliding action of the temple in effecting the proper stretching of the web of the fabric by relieving the roller which is next to the reed from most of the strain due to the contraction of the fabric after it leaves the temple, this strain being borne in great part by the foremost roller of the temple, so as to leave the other roller free to perform its proper function of stretching the web at and near the beating-up point, so as to draw out the warps to the full width of that portion of the reed through which they pass, and thus prevent side strain on the dents of the reed.

Each of the rollers of the temple is closed at its inner end, and this closed end of the roller is by the tension of the fabric caused to bear firmly against a block or washer *m*, of glass or other vitreous material, secured to the depending inner end of the cover of the pod G; hence the necessity of lubricating the inner bearing of the roller is done away with, and the risk of soiling the fabric is thereby effectually overcome.

The swinging movement of the temple is restricted by a hooked arm *p*, which is secured by a set-screw *p'* in a stud *s*, projecting from the front of the plate A, this hook engaging with a projecting lug *t* at the end of the temple-plate, as shown in Fig. 2. To the temple-plate is also hung a hooked catch *w*, which, when the temple is drawn forward to its full extent, may be turned down so as to engage with the lug *t*, and thus hold the temple out of action.

I am aware that temple-rollers have been provided with pivot-pins of glass or other vitreous material; but a bearing-plate such as that which I employ is free from the lateral strain to which such pivot-pins are subject, and hence is less liable to fracture.

I am also aware that a bearing plate or disk has been applied to the inner end of a temple-roller; but owing to the susceptibility of the wooden roller to change, due to different atmospheric conditions, the securing of a plate of glass or like material to such wooden roller would be impracticable, whereas the objection is overcome if said plate is secured to the metallic casing or pod of the temple.

Having thus described my invention, I claim and desire to secure by Letters Patent—

1. The combination of the temple-plate and a spring supporting the same, but on which it is free to slide longitudinally, with a second spring, the free end of which is connected to said temple-plate, whereby on beating up said controlling-spring is compressed and the temple-plate is caused to move longitudinally on the supporting-spring to stretch the fabric, substantially as specified.

2. The combination of the temple-plate, a looped or bowed spring secured at one end and carrying the temple-plate on its free end, and a controlling-spring secured at one end to the main or supporting spring of the temple and engaging at its free end with a lug on the temple-plate, substantially as specified.

3. The combination of the fixed plate of the temple and the spring-supported temple-plate having a projecting lug at the end, with a hooked and pivoted catch carried by the fixed plate of the temple and engaging with a lug on the temple-plate to hold the temple out of action, substantially as specified.

4. The combination of the temple-roller, the supporting-spindle therefor, the temple case or pod, and a block of glass or other vitreous material secured to the inner end of said case and providing a bearing for the inner end of the temple-roller, substantially as specified.

In testimony whereof I have signed my name to this specification in the presence of two subscribing witnesses.

ORIN PIPER.

Witnesses:
GEORGE M. HUNKINS,
ALMER A. PIPER.